Aug. 20, 1929.   L. B. WINTON   1,725,554
DIFFERENTIAL PRESSURE GAUGE
Filed April 23, 1928
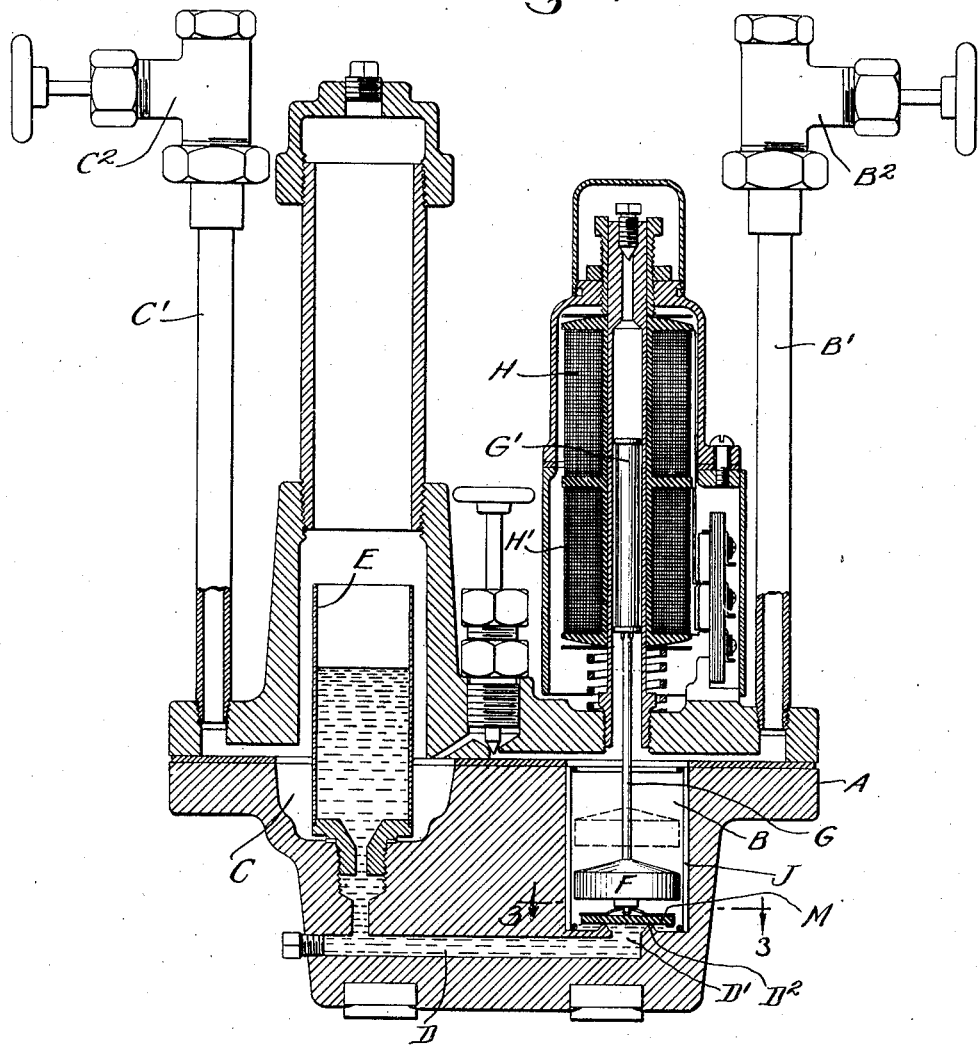
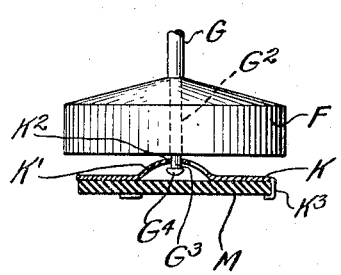
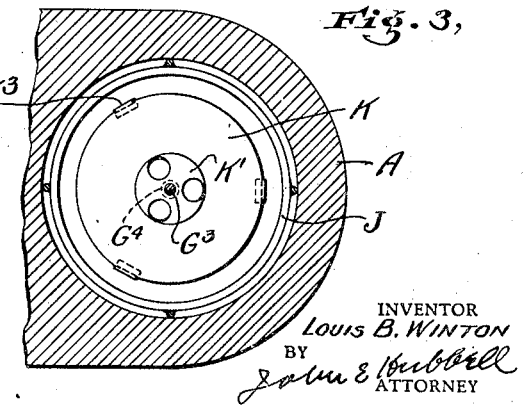
INVENTOR
Louis B. Winton
BY
ATTORNEY Patented Aug. 20, 1929.

1,725,554

UNITED STATES PATENT OFFICE.

LEWIS B. WINTON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA.

DIFFERENTIAL PRESSURE GAUGE.

Application filed April 23, 1928. Serial No. 272,083.

The present invention relates to differential pressure gauges of the type wherein a pair of vertical chambers connected at their lower ends and containing a suitable liquid, usually mercury, are connected by piping to a pressure difference creating device. Such gauges are particularly suitable for determining the amount of fluid passing through a fluid conduit. Sudden and excessive pressure variations on the high pressure side of such gauges often result in forcing the liquid therein over into the conduit containing the fluid being measured whereby the measuring liquid is lost and the gauge rendered inoperative. Various devices have been proposed for closing the connection between the high and low pressure chambers to prevent the loss of the measuring liquid, but all of these have been found defective either in failing to effectively close the opening or in being so slow acting that a major portion of the measuring liquid is lost before the connection is closed.

The object of my present invention is to provide simple and effective means for sealing the passage from the bottom of the high pressure chamber which are characterized by the effectiveness and rapidity of the sealing action.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 1 is an elevation partly in section of a differential pressure gauge incorporating my invention;

Fig. 2 is an enlarged view of the gauge float and sealing means; and

Fig. 3 is a section on the line 3—3 of Fig. 1.

In the drawings I have illustrated a preferred embodiment of my invention in which a manometer or differential pressure gauge A is provided with a high pressure chamber B and a low pressure chamber C having circular openings in the bottoms thereof connected by a substantially horizontal passage D. The high pressure chamber is connected by a pipe B' to the high pressure side of a pressure difference creating device, such as a diaphragm having an orifice therein located in a conduit carrying a fluid, the quantity of which is to be measured. Such devices are well known in the art and illustration here is unnecessary. The low pressure chamber is similarly connected by a pipe C' to the low pressure side of the pressure difference creating device. The pipe B' is connected to the upper end of the high pressure chamber B while the pipe C' is connected to a lower portion of the low pressure chamber. Valves B² and C² in the pipe connections B' and C', respectively, provide means for disconnecting the gauge from the conduit. A cylindrical tube E is threaded in the opening in the bottom of the low pressure chamber at one end of the connecting passage D.

A measuring liquid such as mercury partially fills the high pressure chamber B, the tube E in the low pressure chamber C, and the passage D therebetween. A cylindrical metallic float F is positioned in the high pressure chamber and arranged to respond to the variations in the liquid level therein. A vertical rod G having a magnetic body or armature G' at the upper end thereof is connected to the float. A pair of inductance coils H and H', arranged in end to end relation, surround the armature G' so that the movements of the latter relative to the coils varies the relative inductance of the coils. The variations in inductance are transmitted by an impedance bridge system to an indicating device (not shown) as is now well known in the art. A guide cage J of cylindrical form is arranged in the high pressure chamber for guiding the movements of the float F.

The connecting passage D is provided with a vertical end portion D' leading to the high pressure chamber B. The chamber bottom is provided with an annular raised portion D² surrounding the upper end of the passage D'. My invention comprises means for sealing the upper end of the passage D'.

The sealing means of my invention comprise a valve having a universal connection with the lower end of the float rod. The rod G is formed with a reduced portion G² extending through the float F, which is secured thereon in any suitable manner. The portion $G^3$ of the rod below the float is further reduced in diameter for a short distance and the extreme lower end of the rod formed in the shape of a button $G^4$. A metallic disc K having its center portion $K'$ bulging upwardly is loosely mounted on the rod portion $G^3$. The projecting portion $K'$ is arranged with a central opening $K^2$ therein larger in diameter than the rod portion $G^3$ on which it is mounted and smaller in diameter than the button $G^4$. The disc is thus freely moveable vertically on the rod portion $G^3$ and can be rocked thereon to a certain degree in any direction.

The edge portion of the disc K is provided with a plurality of radially projecting arms $K^3$ arranged to be bent downwardly and inwardly to hold a resilient disc M of material suitable to withstand the action of the measuring liquid such as rubber or a rubber compound in position against the underside of the disc K as shown in the drawings.

With the construction shown, on an increase in fluid pressure on the measuring liquid in the high pressure chamber the level of the liquid therein falls resulting in a lowering of the float and sealing valve. The normal operating position of the float is shown by the dotted lines in Fig. 1 and for normal changes in pressure in the conduit the position of the float is only slightly changed. On a sudden and excessive increase in pressure in the high pressure chamber the level of the measuring liquid falls rapidly with a corresponding increase in the level of the liquid in the low pressure chamber. Such increases in pressure, if of sufficient amount, may force the measuring liquid over into the conduit containing the fluid being measured. The float is so proportioned and of such weight that it responds instantly to any change in level of the measuring liquid and on such an excessive increase in pressure the float drops rapidly until the sealing disc contacts with the raised portions of the chamber bottom surrounding the opening therefrom.

My invention is characterized particularly by the effectiveness of the sealing means and the rapidity with which the seal becomes effective. The universal connection between the sealing means and the end of the rod insures an effective seal whether or not the float rod is in exact alignment with the opening at the bottom of the high pressure chamber. Since the sealing disc is a substantial distance below the bottom of the float, the seal necessarily becomes effective a period of time before that at which the disc would be effective if it formed an integral part of the float. This time period while small is sufficient to retain a substantial portion of the measuring liquid in the high pressure chamber.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a differential pressure gauge having high and low pressure chambers connected at their lower ends, a measuring liquid therein, a float in said high pressure chamber subject to the flotative action of said liquid, and means for closing the connection between said chambers on an excess of pressure in said high pressure chamber, said means comprising a valve disc pivotally connected to said float for tilting movement and arranged to seal the passage from said high pressure chamber.

2. In a differential pressure gauge having high and low pressure chambers connected at their lower ends, a measuring liquid therein, a float in said high pressure chamber subject to the flotative action of said liquid, a vertical rod connected near its lower end to said float, and sealing means tiltably connected to the lower end of said rod below said float for sealing the passage from said high pressure chamber on a sudden increase in pressure on the liquid in said chamber.

3. In a differential pressure gauge having high and low pressure chambers connected at their lower ends, a measuring liquid therein, a float in said high pressure chamber subject to the flotative action of said liquid, a vertical rod having said float secured near its lower end, and means for sealing the liquid outlet opening from the lower end of said high pressure chamber, said means comprising a valve holding disc having a universal connection with the lower end of said rod below said float, a resilient valve disc secured to the lower face of said first mentioned disc and arranged to contact with the portion of said chamber bottom surrounding the liquid outlet therein.

Signed at Philadelphia, in the county of Philadelphia and State of Pennsylvania, this 20th day of April, A. D. 1928.

LEWIS B. WINTON.